(12) United States Patent
Morimoto et al.

(10) Patent No.: US 7,528,345 B2
(45) Date of Patent: May 5, 2009

(54) POWER SUPPLY APPARATUS FOR WELDER

(75) Inventors: Takeshi Morimoto, Osaka (JP); Kenzo Danjo, Osaka (JP); Tetsuro Ikeda, Osaka (JP); Hideo Ishii, Osaka (JP)

(73) Assignee: Sansha Electric Manufacturing Company, Limited, Osaka-shi, Osaka-fu (JP)

( * ) Notice: Subject to any disclaimer, the term of this patent is extended or adjusted under 35 U.S.C. 154(b) by 1 day.

(21) Appl. No.: 11/782,215

(22) Filed: Jul. 24, 2007

(65) Prior Publication Data

US 2008/0047941 A1    Feb. 28, 2008

(30) Foreign Application Priority Data

Jul. 25, 2006    (JP)    ............................ 2006-202001

(51) Int. Cl.
*B23K 9/09* (2006.01)
(52) U.S. Cl. .............................................. 219/137 PS
(58) Field of Classification Search .. 219/130.1–137 PS
See application file for complete search history.

(56) References Cited

U.S. PATENT DOCUMENTS 5,457,300 A * 10/1995 Karino et al. .......... 219/130.32
6,194,681 B1 * 2/2001 Moriguchi et al. ..... 219/121.54

FOREIGN PATENT DOCUMENTS

JP    2000061636    2/2000

* cited by examiner

*Primary Examiner*—Sang Y Paik
(74) *Attorney, Agent, or Firm*—Duane Morris LLP

(57) ABSTRACT

A welder power supply apparatus (10) includes an inverter (20), which is driven intermittently when an electrode (34) and a workpiece (36) are separated from each other and no arc is being generated between them, whereby power loss generated in the inverter (20) when the inverter (20) is driven in the non-load state of the power supply apparatus and power loss caused by exciting current flowing through an transformer (24) disposed in the output of the inverter (20) can be reduced. The inverter (20) is driven continuously when output current (Io) becomes higher than a threshold value (Ib) after the electrode (34) and the workpiece (36) are brought into contact with each other for starting arcing between them. In this manner, the arcing can be initiated without fail.

4 Claims, 6 Drawing Sheets

POWER SUPPLY APPARATUS FOR WELDER

This invention relates to a power supply apparatus for welders and, more particularly, a power supply apparatus for touch-start welders, in which an arc is generated between an electrode and a workpiece by first bringing electrode and the workpiece in contact with each other and, then, separating them.

BACKGROUND OF THE INVENTION

An example of a power supply apparatus for welders of this type is described in, for example, JP 2000-61636 A. The power supply apparatus disclosed in JP 2000-61636 A includes an input-side AC-to-DC converter, which converts an AC voltage to a DC voltage. The DC voltage from the converter is converted to a high-frequency voltage in an inverter. The high-frequency voltage from the inverter is voltage-transformed by a transformer. An output-side AC-to-DC converter converts the voltage-transformed high-frequency voltage to a DC voltage for application to an electrode and a workpiece. When the electrode in contact with the workpiece is separated from the workpiece, an arc is generated between the electrode and the workpiece.

Changes of an output voltage Vo applied to the electrode and the workpiece, and changes of an output current Io flowing through the electrode and the workpiece may be as shown in FIGS. 1(a) and 1(b), for example. Specifically, let it be assumed that, at a time t10, the apparatus is non-load state, where the electrode and the workpiece are separated from each other and no arc is present between them. As shown in FIG. 1(a), the output voltage Vo maintains a predetermined voltage value Va, which may be, for example, several tens of volts (V), necessary for generating an arc. On the other hand, the output current Io is zero amperes (A) as shown in FIG. 1(b).

At a time t11, which is later than the time t10, when the electrode and the workpiece are brought into contact with each other, the output current Io abruptly increases. On the other hand, the output voltage Vo decreases abruptly to about zero volts (Vo≈0 [V]). At a time t12 following the time t11, when the electrode and the workpiece are separated by some distance, an arc is generated between them. The arcing is maintained by keeping an appropriate distance between the electrode and the workpiece. In order to stabilize the arcing, the inverter is constant-current controlled so as to maintain the output current Io at a constant current value Ia. The constant-current control of the inverter also makes the output voltage Vo stable at a constant voltage value Vb. The voltage value Vb is dependent on the current value Ia of the output current Io, but, usually, it is smaller than the voltage value Va.

When the distance between the electrode and the workpiece is made larger at a time t13, which is later than the time t12, the arcing ceases, and the apparatus returns to the non-load state, According to the described prior art, when the power supply apparatus is in the non-load state, the output voltage Vo is maintained at the constant voltage value Va necessary for starting arcing, and therefore arcing can be securedly started. However, since the inverter is driven even when the apparatus is in the non-load state, in order to maintain the output voltage Vo at the constant voltage value Va, power loss occurs. Also, since some exciting current flows through the transformer, power loss due to this exciting current occurs, too. That is, some non-load power loss represented by hatched portions 100 in FIG. 1(a) occurs. Consequently, the power consumption by the power supply apparatus as a whole increases.

An object of the present invention is to provide a power supply apparatus for welders which consumes less power than prior art welder power supply apparatus.

SUMMARY OF THE INVENTION

In a power supply apparatus for touch-start welders according to the present invention, an arc is generated between an electrode and a workpiece by first bringing the electrode and the workpiece in contact with each other and then separating them apart. The welder power supply apparatus includes an inverter for converting a DC voltage applied via an input terminal thereof into a high-frequency voltage. The high-frequency voltage from the inverter is voltage-transformed to a voltage-transformed high-frequency voltage in a transformer. Output means converts the voltage-transformed high-frequency voltage into a predetermined form, e.g. a DC voltage or a low-frequency AC voltage, and outputting the converted version of the voltage from the transformer between output terminals which are adapted to be connected to the electrode and the workpiece. Judging means judges whether a request for starting arcing has been made or not, and inverter control means controls the inverter in accordance with the judgment made by the judging means. The inverter control means, when a judgment that starting arcing has been requested for is made, controls the inverter in such a manner that the output voltage developed between the output terminals assumes a first value necessary for starting arcing. On the other hand, when it is judged that a request for starting arcing has not yet been made, the inverter control means controls the inverter in such a manner that the output voltage assumes a second value smaller than the first value.

The inverter control means may continuously drive the inverter so that the inverter can develop the output voltage at the first value, and intermittently drive the inverter so that the inverter can develop the output voltage at the second value.

When the inverter is intermittently driven, it is desirable that the period during which the inverter is driven be shorter than the period during which the inverter is not driven.

The judging means may judge whether or not a request for starting arcing has been made, from the output current flowing through the output terminals. For example, when the electrode and the workpiece are brought into contact with each other for initiating an arc between them, the output current abruptly increases. The judging means sees when the output current abruptly increases, or increases, for example, to a value above a predetermined threshold value, it determines that the electrode and the workpiece have been brought into contact with each other.

When, however, the inverter is intermittently driven, the output current does not increase immediately if the electrode and the workpiece are brought into contact during the period in which the inverter is not driven, but it increases in the following period during which the inverter is driven. Thus, if the judging means makes judgment, based on such output current, whether or not a request for starting arcing has been made, there is a time delay from the time when the electrode and the workpiece are brought into contact to the time when the judging means recognizes that the contact has been made.

In order to eliminate such time delay, judgment voltage providing means may be additional provided, which develops a voltage for use in such judgment between the output terminals, so that the judgment by the judging means can be made even during the period in which the inverter is not driven.

DESCRIPTION OF PREFERRED EMBODIMENTS

A power supply apparatus for welders according to one embodiment of the invention is described with reference to FIGS. 2 through 6(b).

Figure 2:
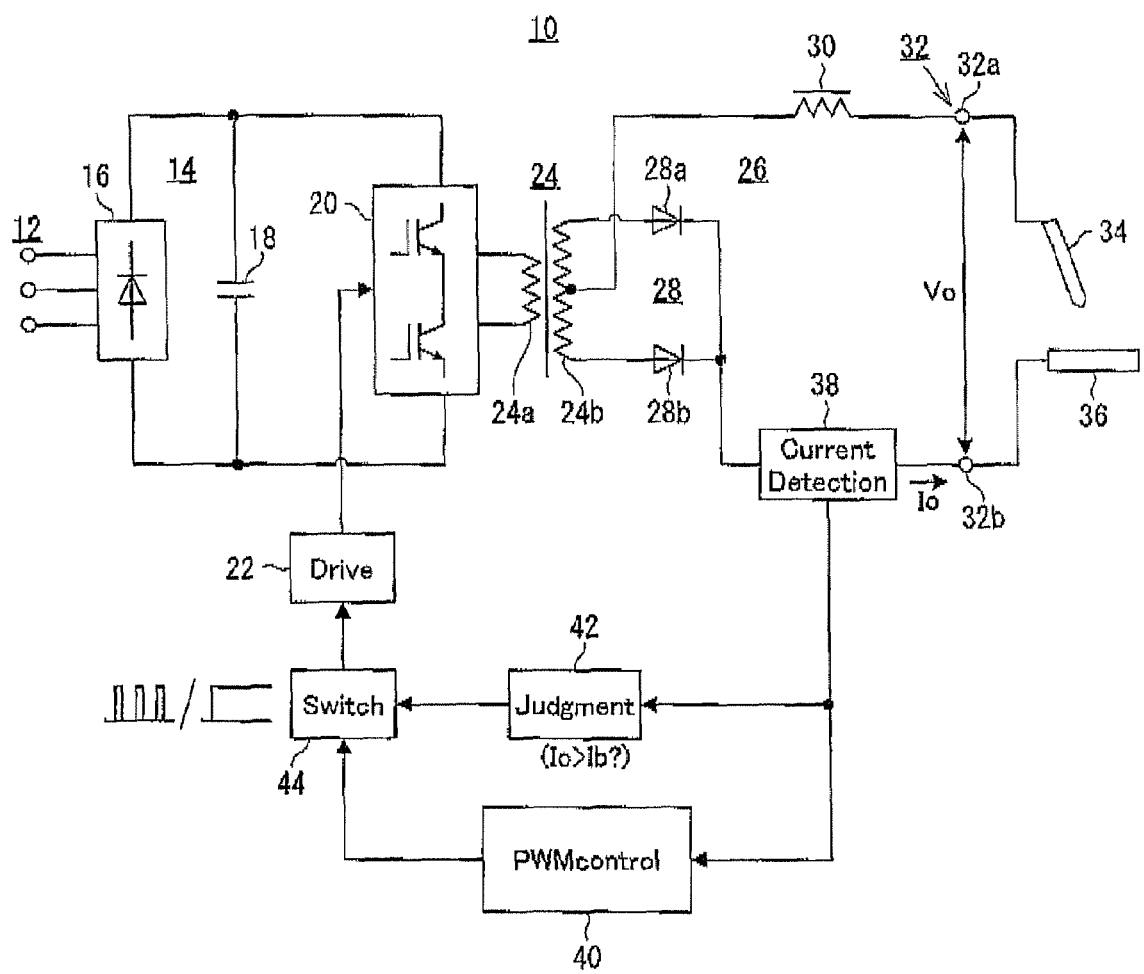
FIG. 2 is a schematic circuit diagram of a power supply apparatus for welders according to an embodiment of the present invention.

As shown in FIG. 2, a power supply apparatus for welders (hereinafter sometimes referred to welder power supply apparatus) 10 has input terminals 12 to which a three-phase commercial AC voltage is applied. The commercial AC voltage applied to the input terminals 12 is coupled to converting means, e.g. an input-side rectifying and smoothing circuit 14, and converted to a DC voltage in the circuit 14. The input-side rectifying and smoothing circuit 14 is formed of input-side rectifying means, e.g. a three-phase bridge rectifying circuit 16, for rectifying the commercial AC voltage, and input-side smoothing means, e.g. a smoothing capacitor 18, for smoothing the rectified voltage from the three-phase bridge rectifying circuit 16.

The DC voltage from the input-side rectifying and smoothing circuit 14 is applied to an inverter 20, where it is converted to a high-frequency voltage at a frequency in the range of, for example, from 10 kHz to 100 kHz. Although not shown in detail in the drawings, the inverter 20 includes a plurality of switching devices, for example, IGBTs, bipolar transistors or FETs. The switching devices perform switching operation in response to drive signals applied thereto from a later-mentioned drive circuit 22.

The high-frequency voltage from the inverter 20 is applied to a primary winding 24a of a transformer 24. The high-frequency voltage voltage-transformed in the transformer 24 is outputted from a secondary winding 24b of the transformer 24 and applied to output means, e.g. an output-side rectifying and smoothing circuit 26.

The output-side rectifying and smoothing circuit 26 shapes, for example, converts the voltage-transformed high-frequency voltage from the transformer 24 into a DC voltage. The output-side rectifying and smoothing circuit 26 includes output-side rectifying means for rectifying the voltage-transformed high-frequency voltage and output-side smoothing means for smoothing the rectified voltage from the output-side rectifying means. The output-side rectifying means may be, for example, full-wave rectifying circuit 28 formed of two diodes 28a and 28b, and the output-side smoothing means may be, for example, a smoothing reactor 30. The DC voltage from the output-side rectifying and smoothing circuit 26 is outputted, as an output voltage Vo, via an output terminal arrangement 32 including a minus terminal 32a and a plus terminal 32b, and applied between an electrode 34 and a workpiece 36 through the minus and plus terminals 32a and 32b. In the illustrated embodiment, the electrode 34 is connected to the minus terminal 32a, and the workpiece 36 is connected to the plus terminal 32b.

Current detecting means, e.g. a current detecting circuit 38, is connected between the output of the full-wave rectifying circuit 28 and the plus terminal 32b, for detecting an output current Io flowing between them. The current detecting circuit 38 develops a detected-current representative signal representing the magnitude of the detected output current Io. The detected-current representative signal is applied to a PWM control circuit 40, which is part of inverter control means, and to judging means, e.g. a judging circuit 42. Alternatively, the current detecting circuit 38 may be connected between the output of the smoothing reactor 30 and the minus terminal 32a.

The PWM control circuit 40 continuously provides a PWM control signal for controlling, in the PWM fashion, the inverter 20 in accordance with the detected-current representative signal from the current detecting circuit 38. The PWM control signal changes in such a manner as to make the detected-current representative signal assume a predetermined value. The PWM control signal is applied to a switch circuit 44, which is part of the inverter control means.

The judging circuit 44 sees the detected-current representative signal from the current detecting circuit 38 to judge whether or not the output current Io is flowing and, more specifically, whether the output current Io is above a predetermined threshold Ib which is larger than zero (0). The judging circuit 44 produces a judgment signal representing the result of judgment. The judgment signal is also applied to the switch circuit 44.

The switch circuit 44 switches its state between a first state and a second state, depending on whether the output current Io exceeds the threshold value Ib or not. If the output current Io is above the threshold value Ib, the switch circuit 44 assumes the first state in which the switch circuit 44 outputs the PWM control signal from the PWM control circuit 40 as it is. When the output current Io is equal to or smaller than the threshold value Ib, the switch circuit 44 assumes the second state in which the PWM control signal from the PWM control circuit 40 is outputted intermittently.

The PWM control signal either continuously or intermittently outputted from the switch circuit 44 is applied to a drive circuit 22, which is part of the inverter control means. The drive circuit 22 produces a drive signal based on the inputted PWM control signal for application to the inverter 20.

Figures 3A, 3B:
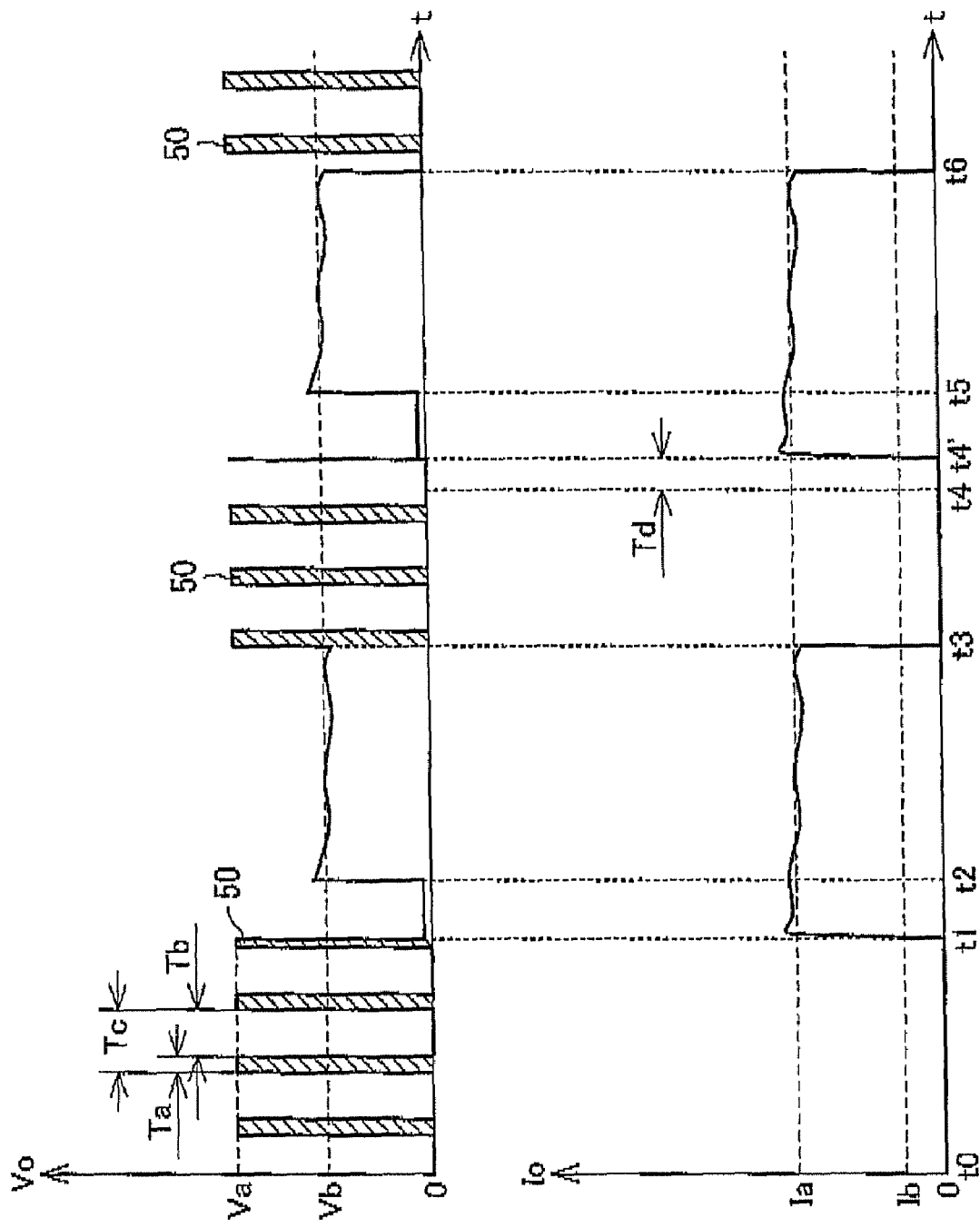
FIGS. 3(a) and 3(b) show changes of output voltage and output current in the power supply apparatus shown in FIG. 2.

In the welder power supply apparatus with the above-described arrangement, the output voltage Vo and the output current Io change as shown in FIGS. 3(a) and 3(b), respectively.

More specifically, let it be assumed that, at a time t0 in FIGS. 3(a) and 3(b), the power supply apparatus is in a non-load state with the electrode 34 and the workpiece 36 separated from each other, and that the non-load state is maintained until a time t1. In this non-load state, the output current Io does not flow, as shown in FIG. 3(b), and the output current Io is below the threshold value Ib. Thus, the switch circuit 44 assumes the second state. In this state, the PWM control signal has changed to make the detected-current representative signal assume a predetermined value. The switch circuit 44 outputs the PWM control signal intermittently. The inverter 20 is intermittently driven in response to the drive signal prepared in accordance with the intermittently outputted PWM control signal. As a result, the output voltage Vo pulsates, as shown in FIG. 3(a), exhibiting alternation between a higher voltage interval Ta in which the output voltage Vo assumes a given constant value Va, and a lower voltage interval Tb in which the output voltage Vo assumes zero (0).

The higher voltage interval Ta corresponds to the period during which the inverter 20 is driven, and the lower voltage interval Tb corresponds to the period during which the inverter 20 is not driven. The higher voltage interval Ta is shorter than the lower voltage interval Tb and is, for example, 1 ms, whereas the lower voltage interval Tb is, for example, 9 ms. The period Tc, which is the sum of the higher and lower voltage intervals Ta and Tb, is 10 ms, and the duty ratio of the higher voltage interval Ta to the period Tc (i.e. Ta/Tc) is 0.1.

The voltage value Va of the output voltage Vo during the higher voltage interval Ta is a value large enough to initiate arcing, Va=about 60 V, for example. The magnitude of the voltage Va is dependent on the conditions of the electrode 34 and the workpiece 36, including, for example, the sizes and types of the electrode 34 and the workpiece 36. Now, let it be assumed that, at the time t1, the electrode 34 and the workpiece 36 are brought into contact with each other. The average of the output voltage Vo during the time period from t0 to t1 is smaller than the voltage value Va necessary for starting the arcing.

Assuming that the time t1 is within the higher voltage interval Va of the output voltage Vo, the output current Io abruptly increases to a value above the threshold value Ib as shown in FIG. 3(b) since the electrode 34 and the workpiece 36 are in contact with each other. This makes the switch circuit 44 assume the first state in which the PWM control signal is continuously outputted. The inverter 20 is continuously driven by the drive signal prepared in accordance with the continuously applied PWM control signal to thereby make the detected-current representative signal have the predetermined value. The output voltage Vo now is substantially zero (0) as shown in FIG. 3(a) since the electrode 34 and the workpiece 36 are in contact with each other.

When the electrode 34 is separated from the workpiece 36 at a time t2, an arc is generated between them. This arc is maintained by keeping an appropriate distance between the electrode 34 and the workpiece 36. The inverter 20 is controlled to make the detected-current representative signal assume the predetermined value, and therefore, as shown in FIG. 3(b), the output current Io assumes the constant current value Ia, whereby the arcing is stabilized. This makes the output voltage Vo stable at a constant voltage value Vb, as shown in FIG. 3(a). The magnitude Ia of the output current Io when the arcing is stable is dependent on the conditions of the electrode 34 and the workpiece 36, but it generally is within a range of from about 200 A to about 600 A. The magnitude Vb of the output voltage Vo is dependent on the magnitude Ia of the output current Io, and it generally is within a range of from about 20 V to about 30 V.

Next, when the electrode 34 and the workpiece 36 are separated by a larger distance at a time t3, the arc disappears, and the power supply apparatus returns to its non-load state. Then, as shown in FIG. 3(b), it becomes that the output current Io does not flow. Such decrease of the output current Io below the threshold value Ib switches the switch circuit 44 to the second state, so that the inverter 20 is intermittently driven. As a result, the output voltage Vo pulsates again as shown in FIG. 3(a).

Let it be assumed that, at a time t4, which is within the lower voltage interval Tb of the output voltage Vo, the electrode 34 and the workpiece 36 are brought into contact with each other. In this case, the output current Io does not increases instantly, but it increases at a time t'4 at which the higher voltage interval Ta of the output voltage Vo comes. Increase of the output current Io causes the inverter 20 to be driven continuously, enabling arcing to be initiated. In this way, if the electrode 34 and the workpiece 36 are brought into contact with each other for initiating arcing during the lower voltage interval Tb of the output voltage Vo, a time delay Td between the time t4 at which the electrode 34 and the workpiece 36 are brought into contact and the time t'4 at which the initiation of arcing becomes possible. This time delay Td is at least shorter than the lower voltage interval Tb, i.e. Td<9 ms and, therefore does not cause any practical problems in manual welding, in particular.

When the electrode 34 and the workpiece 36 are separated after that, at a time t5, for example, an arc is generated between the electrode 34 and the workpiece 36 as occurred at the time t2. The arc is sustained by keeping the appropriate distance between the electrode 34 and the workpiece 36 and is stabilized by constant-current controlling the inverter 20. When the electrode 34 and the workpiece 36 are separated by a further distance at a time t6, the arc disappears as occurred at the time t3, and the power supply apparatus returns to the non-load state.

Figure 1:
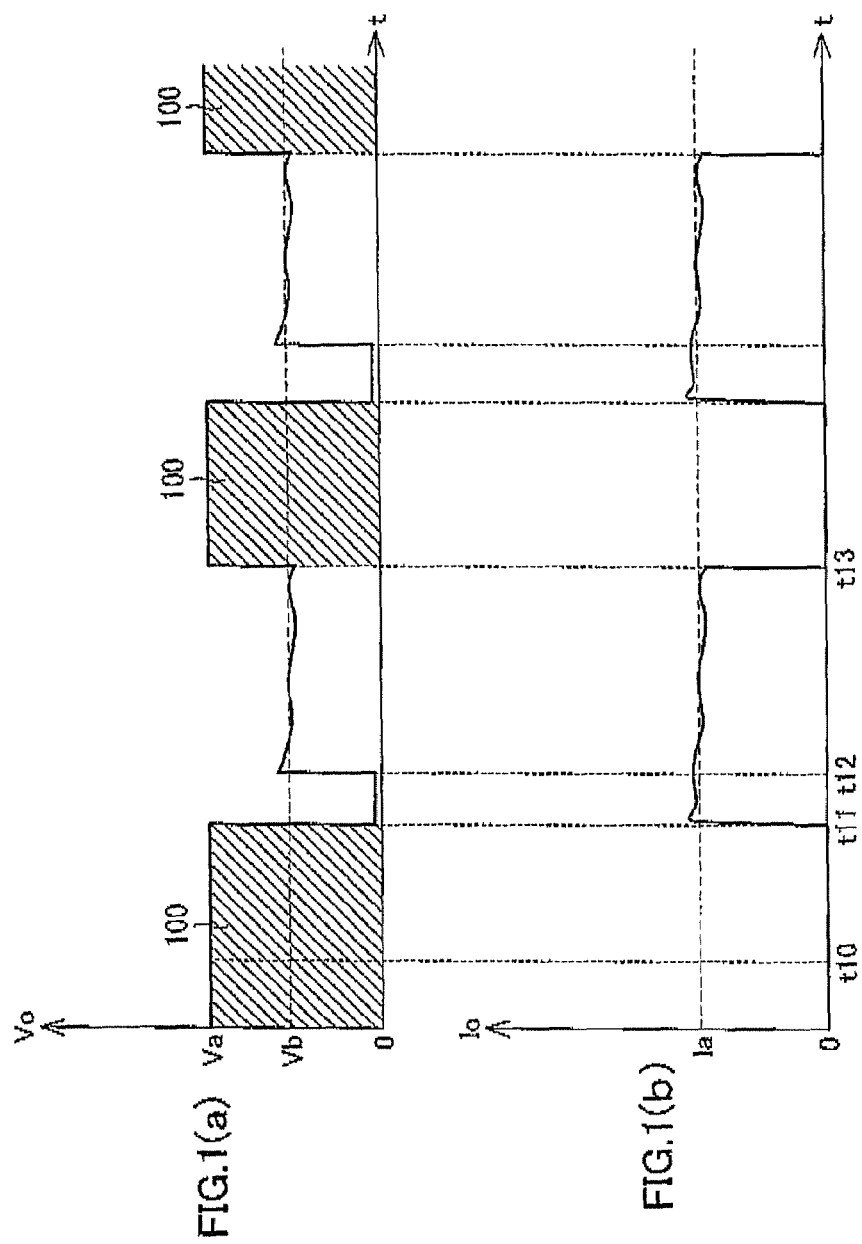
FIGS. 1(a) and 1(b) show changes of output voltage and output current in a prior art welder power supply apparatus.

As described above, according to the described embodiment, in the non-load state of the power supply apparatus, the output voltage Vo pulsates, alternating between the higher voltage interval Ta in which the output voltage Vo assumes the value Va necessary for starting arcing and the lower voltage interval Tb in which the output voltage Vo assumes the value of zero (0), and, only during the higher voltage intervals Ta, the inverter 20 is driven and the exciting current flows in the transformer 24. In other words, during the lower voltage intervals Tb, the inverter 20 is not driven and, therefore, no exciting current flows in the transformer 24. Accordingly, in comparison with the aforementioned prior art power supply apparatus in which, when the apparatus is in the non-load state, the output voltage Vo is maintained at the value Va required for starting arcing, power loss due to the inverter 20 being driven even in the non-load state and power loss due to the exciting current flowing through the transformer 24 even in the non-load state, can be reduced. Specifically, while non-load power loss is present in the prior power supply apparatus, as indicated by reference numeral 100 in FIG. 1(a), the occurrence of non-load power loss can be limited only to the higher voltage intervals Ta as indicated by a reference numeral 50 in FIG. 3(a). Thus, the overall power consumption of the welder power supply apparatus can decrease in comparison with prior power supply apparatuses.

The higher voltage interval Ta of the output voltage Vo of the power supply apparatus according to the embodiment has been described to be 1 ms, but it is not limited to 1 ms. For example, the higher voltage interval Ta may be in a range of from 1 ms to 10 ms.

Also, the length of the lower voltage interval Tb can be appropriately selected, and may be, for example, in a range of from several milliseconds to several tens of milliseconds. However, when the time delay Td is taken into account, it is appropriate that the lower voltage interval Tb is 10 ms or so as in the described embodiment.

In place of constant-current controlling the inverter 20 as in the described embodiment, the inverter 20 may be constant-voltage controlled so that the output voltage Vo can assume a constant value when an arc is being generated, or may be constant-power controlled so as to make the output power constant.

Further, in place of PWM controlling the inverter 20, another control system, for example, PAW (Pulse Amplitude Modulation) control system, may be employed.

According to the described embodiment, judgment as to whether the electrode 34 and the workpiece 36 have been brought into contact with each other is made by determining whether the output current Io has exceeded the threshold value Ib. However, any appropriate one of other techniques may be used. For example, some means, e.g. a button, which is manually operated to demand to start arcing may be provided in the apparatus, and whether demand to start arcing has been requested or not can be determined from the state of such means.

According to the described embodiment, the workpiece 36 is connected to the plus terminal 32b, with the electrode 34 connected to the minus terminal 32a, but the electrode 34 may be connected to the plus terminal 32b with the workpiece 36 connected to the minus terminal 32a.

Further, the present invention has been described as being embodied in the DC welder power supply apparatus 10 which provides a DC output voltage Vo and a DC output current Io, but the invention can be embodied in an AC welder power supply apparatus which provides AC output voltage and current at a frequency of several tens of hertz (Hz).

Figures 4A, 4B:
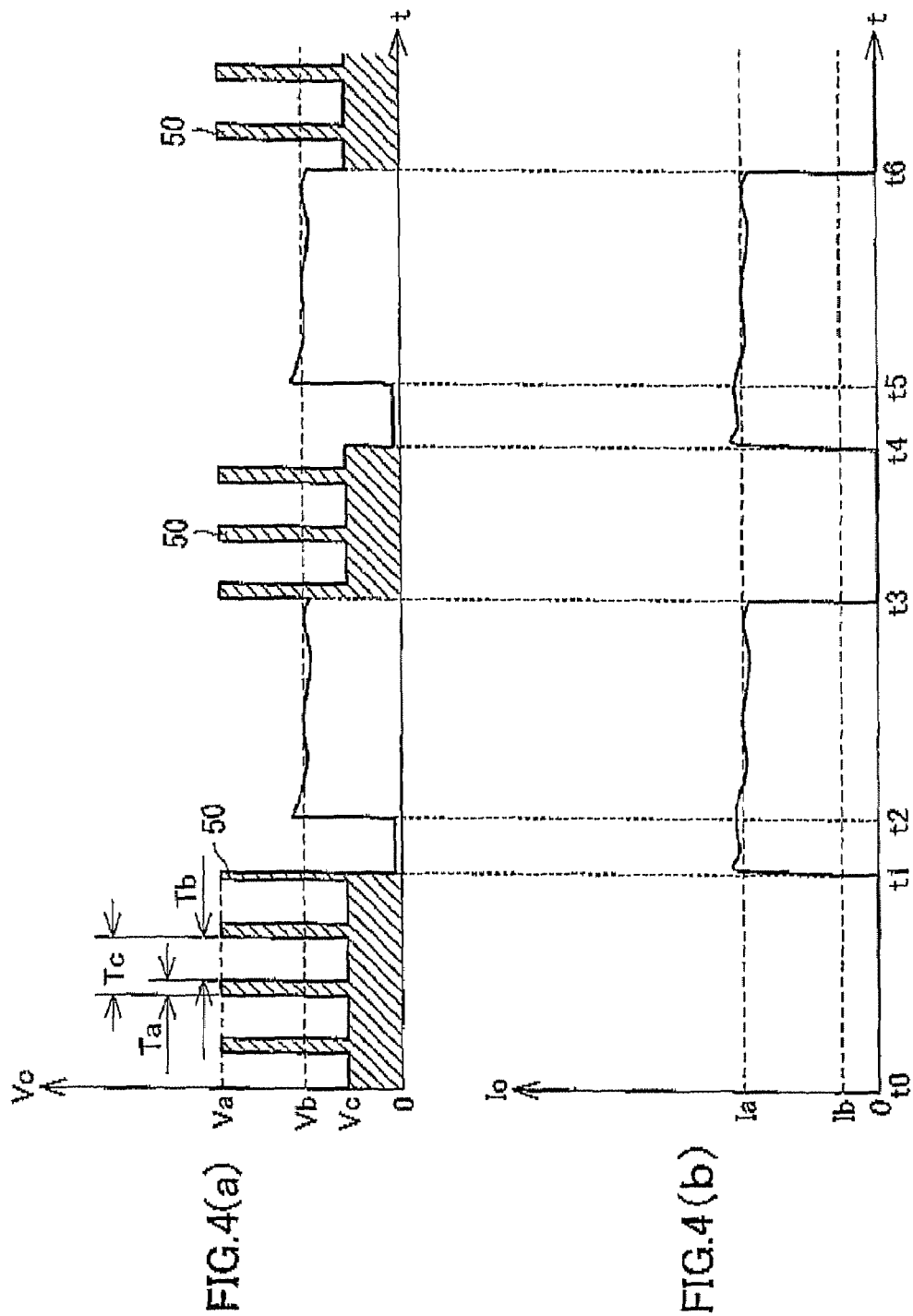
FIGS. 4(a) and 4(b) show changes of output voltage and output current in a modification of the power supply apparatus shown in FIG. 2.

In order to eliminate the aforementioned time delay Td, a voltage Vc may be applied, as a voltage for use in judgment by the judging circuit 42, between the plus terminal 32b and the minus terminal 32a during the lower voltage intervals Tb of the output voltage Vo, as shown in FIG. 4(a). The magnitude of the voltage Vc is selected to be such that the output current Io can exceed the threshold Ib when the electrode 34 and the workpiece 36 are brought into contact during the lower voltage interval Tb. The voltage Vc may be 15 V or so, for example. The use of the voltage Vc makes it possible for the output current Io to immediately increase even when the electrode 34 and the workpiece 36 are brought into contact with each other at a time, for example, t4 shown in FIGS. 4(a) and 4(b), during the lower voltage interval Tb of the output voltage Vo, whereby the time delay Td can be eliminated.

Figure 5:
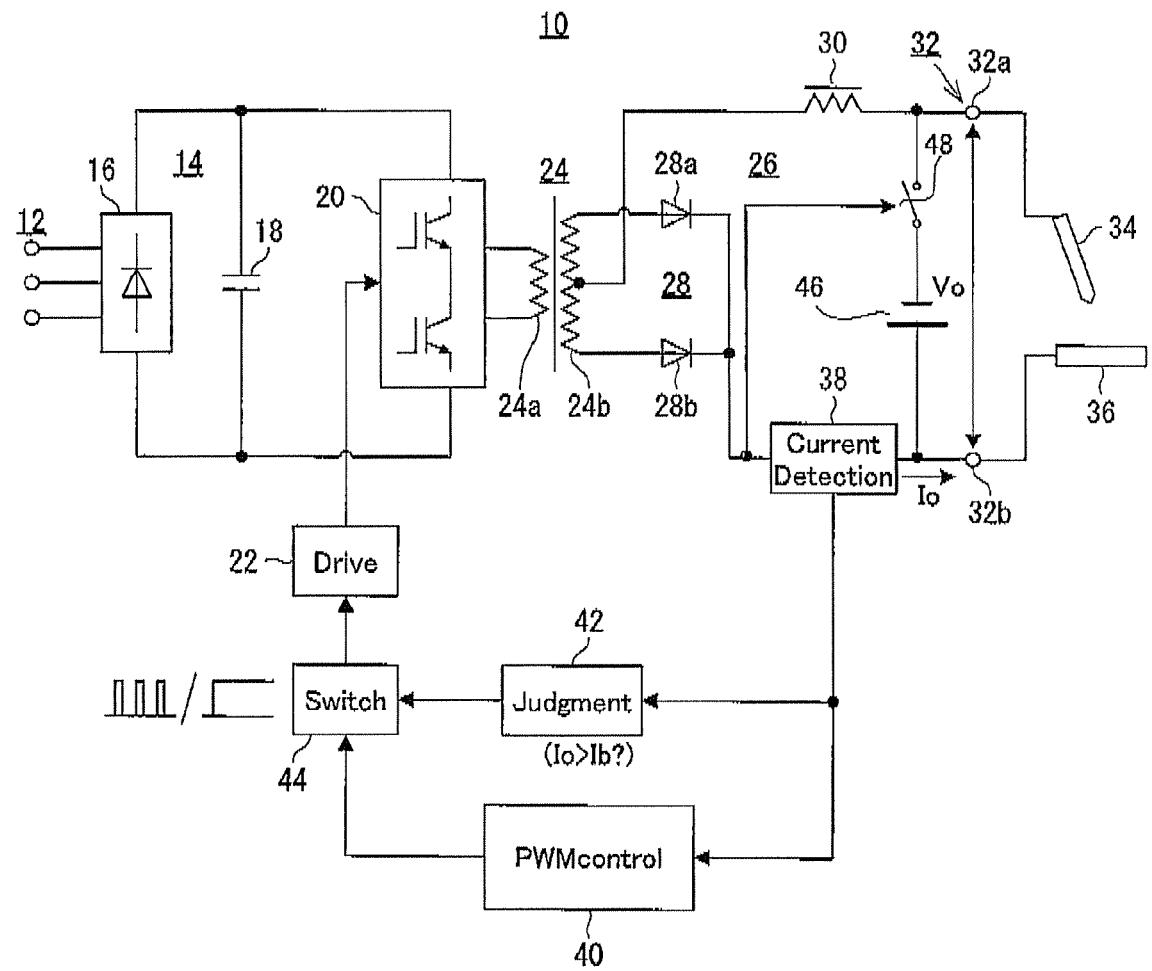
FIG. 5 is a schematic circuit diagram of the power supply apparatus shown in FIG. 4.

An arrangement for providing the voltage Vc during the lower voltage interval Tb of the output voltage Vo is shown in FIG. 5. A series combination of a DC voltage source 46 providing the voltage Vc and a switch 48 is connected between the plus terminal 32b and the minus terminal 32a. The switch 44 is operated in accordance with the result of judgment made by the judging circuit 42. When the judgment signal from the judging circuit 42 indicates that the output current Io is equal to or smaller than the threshold value Ib, the switch 48 is closed in response to the judgment signal. When the judgment signal from the judging circuit 42 indicates that the output current Io is larger than the threshold value Ib, the switch 48 is opened in response to the judgment signal.

Figure 6A:
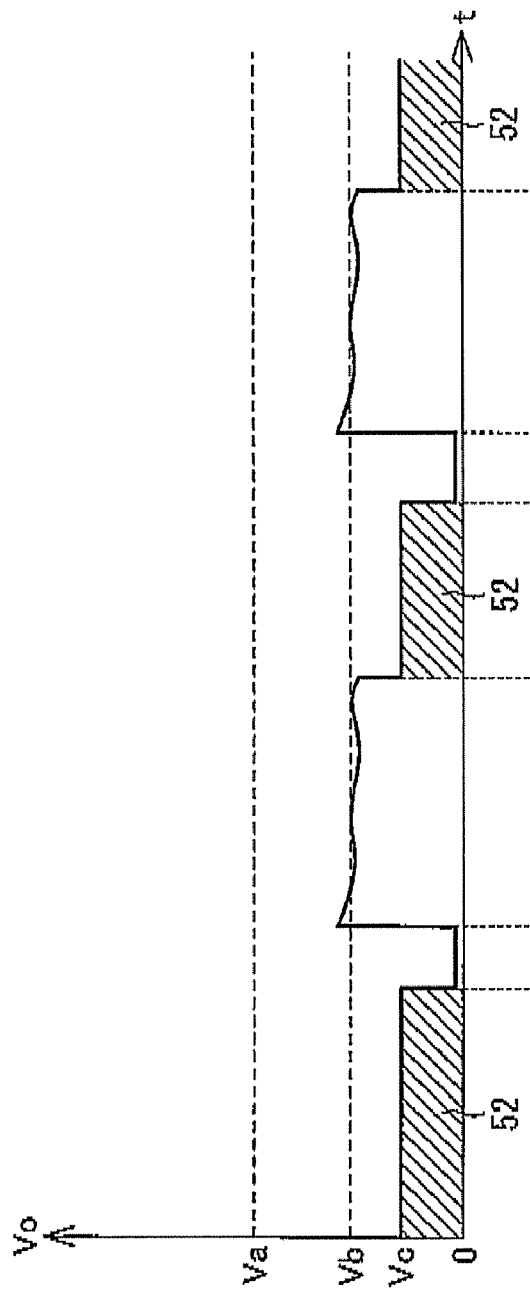
FIGS. 6(a) and 6(b) show changes of output voltage and output current in a modification of the power supply apparatus shown in FIG. 5.
Figure 6B:
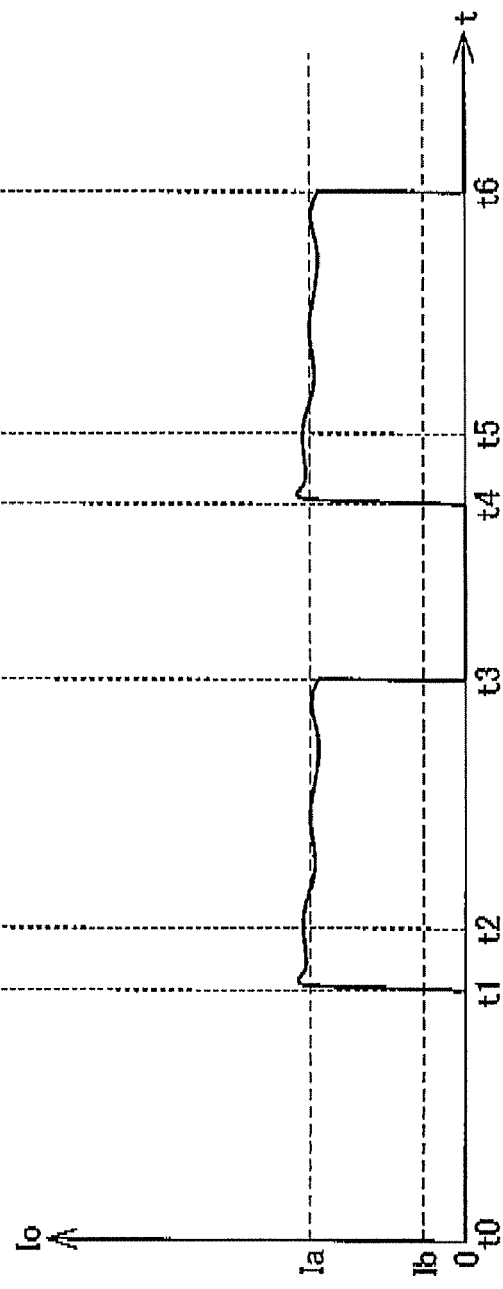

Alternatively, the inverter 20 may be arranged to be driven also during the lower voltage intervals Tb of the output voltage Vo to make the output voltage Vo equal to the voltage Vc. The higher voltage intervals Ta may be eliminated if the inverter 20 is driven also during the lower voltage intervals Tb. Specifically, as shown in FIGS. 6(a) and 6(b), the inverter 20 may be driven to provide the output voltage Vo, which is equal to Vc, when the output current Io is below the threshold value Ib. With such arrangement, too, as indicated by a reference numeral 52 in FIG. 6(a), the non-load power loss can be reduced in comparison with the non-load power loss of the prior power supply apparatus, indicated by the reference numeral 100 in FIGS. 1(a) and 1(b).

The above-described embodiment is only an example to realize the present invention, and the invention is not limited to the described embodiment.

It should be note that the same reference numerals and symbols used in the specification and drawings denote the same or similar components and functions.

What is claimed is:

1. A power supply apparatus for use with a touch-start welder in which an arc between an electrode and a workpiece is generated by bringing said electrode and workpiece into contact with each other and, thereafter, separating said electrode and workpiece from each other, comprising:
    an inverter for converting a DC voltage applied thereto through an input terminal thereof to a high-frequency voltage;
    a transformer for voltage-transforming said high-frequency voltage to provide a voltage-transformed high-frequency voltage;
    output means for converting said voltage-transformed high-frequency voltage to an output voltage of a predetermined form and outputting said output voltage via output terminals to which said electrode and workpiece are adapted to be connected;
    judging means for judging whether a request for generating an arc has been made; and
    inverter control means for controlling said inverter in accordance with the result of judgment made by said judging means;
    said inverter control means, when said result of judgment indicates that a request for generating an arc has been made, controlling said inverter in such a manner that said output voltage can assume a first value necessary for generating the arc, said inverter control means, when said result of judgment indicates that a request for generating an arc has not been made yet, controlling said inverter in such a manner that said output voltage can assume a second value smaller than said first value,
    wherein said first value is provided by continuously driving said inverter, and said second value is provided by driving said inverter intermittently.

2. The power supply apparatus according to claim 1, wherein, when said second value is being provided, the period during which said inverter is driven is shorter than the period during which said inverter is not driven.

3. The power supply apparatus according to claim 1, wherein said judging means makes judgment based on an output current flowing through said output terminals.

4. The power supply apparatus according to claim 3, further comprising judgment voltage providing means for providing a judgment voltage between said output terminals in order to enable said judging means to make the judging operation during said period in which said inverter is not driven.

* * * * *